United States Patent [19]

Müller

[11] Patent Number: 5,673,919
[45] Date of Patent: Oct. 7, 1997

[54] SEALING ARRANGEMENT WITH ELASTOMERIC SLEEVE AND SURROUNDING RECEPTACLE SUPPORTED BY SEPARATE HOUSING SHOULDERS

[75] Inventor: Fritz Müller, Ingelfingen, Germany

[73] Assignee: Gebrüder Müller Apparatebau GmbH & Co. KG, Ingelfingen, Germany

[21] Appl. No.: 761,229

[22] Filed: Dec. 6, 1996

Related U.S. Application Data

[63] Continuation of Ser. No. 540,988, Oct. 11, 1995, abandoned.

[30] Foreign Application Priority Data

Oct. 12, 1994 [DE] Germany .................. 9416432 U

[51] Int. Cl.⁶ ........................................ F16J 15/32
[52] U.S. Cl. ................. 277/2; 277/33; 277/76; 277/152; 277/208
[58] Field of Search ................. 277/2, 33, 75, 277/76, 152, 181, 182, 183, 208

[56] References Cited

U.S. PATENT DOCUMENTS

| | | | |
|---|---|---|---|
| 2,981,232 | 4/1961 | Peras | 277/208 |
| 2,994,571 | 8/1961 | Peras | 277/208 |
| 3,942,805 | 3/1976 | Sundqvist | 277/75 |
| 4,384,724 | 5/1983 | Derman | 277/75 |
| 4,401,307 | 8/1983 | Dechavanne | 277/152 |
| 4,717,161 | 1/1988 | Stremeckus | 277/152 |
| 4,811,704 | 3/1989 | Boehmer et al. | 277/152 |
| 4,898,081 | 2/1990 | Fecher | 277/152 |
| 4,916,938 | 4/1990 | Aikin et al. | 277/2 |
| 4,972,867 | 11/1990 | Ruesch | 277/2 |
| 5,018,752 | 5/1991 | Thomas | 277/152 |
| 5,203,370 | 4/1993 | Block et al. | 277/2 |
| 5,244,183 | 9/1993 | Calvin et al. | 277/2 |
| 5,372,352 | 12/1994 | Smith et al. | 277/2 |

FOREIGN PATENT DOCUMENTS

| | | | |
|---|---|---|---|
| 610269 | 12/1960 | Canada | 277/208 |
| 408827 | 1/1991 | European Pat. Off. | 277/208 |
| 1286775 | 12/1962 | France | 277/208 |
| 3503 | of 1910 | United Kingdom | 277/208 |

*Primary Examiner*—Scott Cummings
*Attorney, Agent, or Firm*—Henry M. Feiereisen

[57] ABSTRACT

A sealing arrangement for an actuator, in particular a valve stem, that is movably mounted in a housing, includes a single-piece, profiled seal body which encircles the actuator in form of a sleeve. The seal body bears upon the actuator under bias and has several ring-type gaskets in form of axially spaced O-ring sealing sections and annular lip sealing sections at the axial ends of the seal body, for sealing fluid and working spaces.

14 Claims, 2 Drawing Sheets

SEALING ARRANGEMENT WITH ELASTOMERIC SLEEVE AND SURROUNDING RECEPTACLE SUPPORTED BY SEPARATE HOUSING SHOULDERS

This is a continuation of patent application Ser. No. 08/540,988, filed Oct. 11, 1995 now abandoned.

BACKGROUND OF THE INVENTION

The present invention refers to a sealing arrangement, and in particular to a sealing arrangement for an actuator that is movably mounted in a housing and may constitute in particular a valve stem for any desired valve assembly.

Conventional sealing arrangements for a valve stem are generally provided in form of several O-ring gaskets that are spaced from each other in axial direction individually or combined to a unit in form of a packing sealing arrangement. In addition, the end faces of the sealing arrangement are formed with end rings. The gaskets are placed in grooved recesses of a support that encircles the actuator in a sleeve-like manner. The production of conventional sealing arrangements for valve stems and their attachment are expensive and cumbersome.

SUMMARY OF THE INVENTION

It is an object of the present invention to provide an improved sealing arrangement for an actuator set in a housing, obviating the afore-stated drawbacks.

In particular, it is an object of the present invention to provide an improved sealing arrangement which reliably seals the fluid and working spaces and can be produced and assembled in a cost efficient and simple manner.

These objects and others which will become apparent hereinafter are attained in accordance with the present invention by providing a sealing arrangement in form of a single-piece, profiled seal body which encircles the actuator in a sleeve-like manner and bears upon the actuator under compression loads, with the seal body having several ring-type gaskets in form of spaced O-ring sealing sections that are spaced axially and annular lip sealing sections that are formed at the axial ends of the seal body, for sealing the fluid and working spaces.

The sealing arrangement according to the present invention is particularly useful for sealing a valve stem of a valve assembly and is advantageously of single-piece configuration of uniform material that includes several axially spaced O-ring gaskets mounted under bias to the actuator, i. e. the valve stem, and also has annular lip sealing sections for sealing the fluid and working spaces. The formation of such a profiled seal body with integral sealing sections can be manufactured in a simple and cost-efficient manner and is installed as a combined unit comprised of valve stem and sealing arrangement for example in a valve. The installation is simplified because only a single seal body needs to be handled compared to conventional proposals which require the installation of several individual gaskets that must be assembled separately. Thus, not only the manufacture but also the assembly itself is considerably facilitated in comparison to conventional constructions.

According to one feature of the present invention, sealing of the gaskets of the seal body is effected by compressive loading achieved by a receptacle that is sandwiched between the housing and the seal body and thus encircles the seal body. This receptacle is preferably made of stiffer material than the single-piece seal body and may suitably be of split configuration. The receptacle for effecting a mechanical bias is positioned and placed around the single-piece seal body, and subsequently this assembly unit of single-piece seal body and receptacle is secured inside the housing at a suitable location of the actuator.

According to another feature of the present invention, the seal body has a leakage bore to permit monitoring of the fluid tightness. Suitably, the leakage bore is positioned between two axially spaced O-ring sealing sections and radially traverses the seal body. The leakage bore in the seal body is in alignment with a bore in the receptacle so as to permit cooperation with suitable monitoring devices by which the fluid-tightness of the sealing sections of the seal body can be observed.

Preferably, the seal body is made of an elastomer or of a fluorinated thermoplastic such as e.g. polyvinyl fluoride.

According to another feature of the present invention, at least one axial end face of the seal body may be formed with an additional annular lip for fluid-tight seal of the housing interior, with the annular lip projecting from the end face in axial direction.

Advantageously, the profiled seal body according to the invention is usable in any desired construction, in particular a valve.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
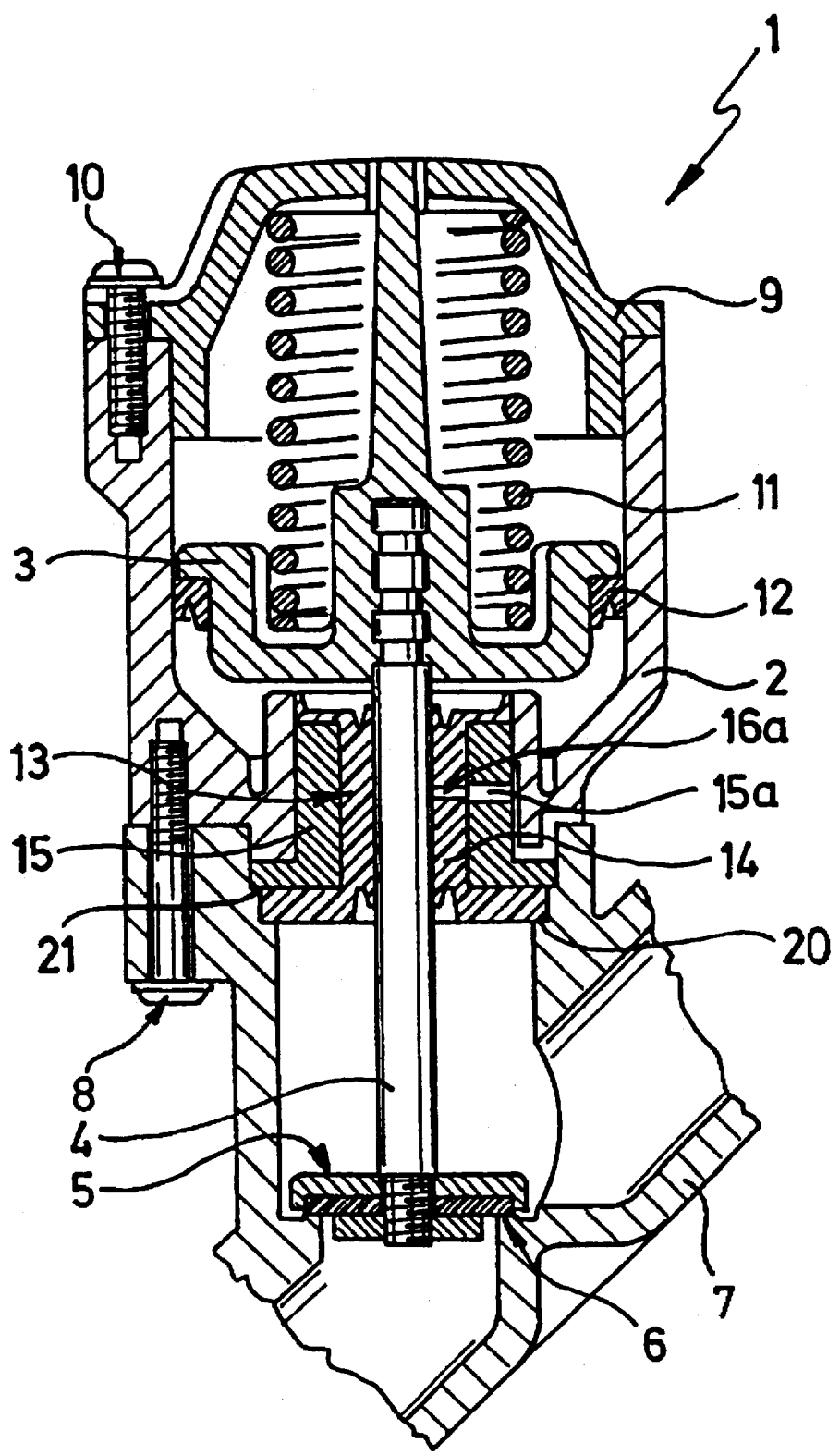
FIG. 1 is a schematic sectional view of an exemplified oblique valve equipped with a sealing arrangement according to the present invention.

Throughout all the Figures, the same or corresponding elements are always indicated by the same reference numerals.

Turning now to the drawing, and in particular to FIG. 1, there is shown a schematic sectional view of an exemplified oblique valve, generally designated by reference numeral 1 which is equipped with a sealing arrangement according to the present invention. Persons skilled in the art will understand that the installation of the sealing arrangement in an oblique valve 1 is done by way of an example only in order to facilitate understanding of the present invention, and the provision of a sealing arrangement according to the present invention should not be limited to installation in such an oblique valve, but may be utilized in any desired construction that includes an actuator which is movably mounted within a housing.

The oblique valve 1 includes a housing 2 in which a piston 3 is supported for movement in an axial direction. Received in the piston 3 is one end of an actuator in form of a valve stem 4, the other free end of which supports a disc 5 for cooperation with a valve seat 6 that is formed by an exemplified valve body 7. The housing 2 is connected to the valve body 7 via a threaded connection 8, suitably a self-tapping screw connection.

The housing 2 is of hollow cylindrical configuration with an open top that is closed by a bonnet 9. A threaded connection 10, suitably a self-tapping screw connection, secures the bonnet 9 to the housing 2. Positioned between the inside wall surface of the bonnet 9 and the piston 3 is a compression spring 11 for loading the piston 3 in direction of closing position of the valve seat 6. A gasket 12, preferably in form an annular lip, is received between the housing 2 and the piston 3.

Arranged at a suitable location beneath the piston 3 is a sealing arrangement which is generally designated by reference numeral 13 and includes a profiled single-piece seal body 14 that encircles the valve stem 4 in form of a sleeve and rests on a circumferential shoulder 20 formed on housing 2. The sealing arrangement 13 is surrounded by a receptacle 15 made of a rigid material and rests on a circumferential shoulder 21 formed by housing 2 and positioned offset to the shoulder 20 that is stiffer than the material of the seal body 14. Examples of materials for the receptacle 15 include metallic or plastic materials. The receptacle 15 is of split configuration and is placed around the seal body 14. The pre-assembled unit of seal body 14 and receptacle 15 is positioned in a suitable bore of the housing 2 and securely attached to the valve body 7 by the screw fastener 8. In the assembled state, the sealing arrangement 13 encircles the valve stem 4 in form of a sleeve, with the receptacle 15 effecting a compressive loading to mechanically bias the seal body 14.

As further shown in FIG. 1, the seal body 14 as well as the receptacle 15 are formed with aligned leakage bores 15a, 16a by which the fluid tightness of the sealing arrangement 13 can be monitored through use of suitable monitoring devices. As these monitoring devices do not form part of the present invention, they are not shown in the foregoing drawings for sake of simplicity.

At operation, an axial displacement of the piston 3, effected for example by operational pressure or control pressure, moves the valve stem 4 in axial direction towards or away from the valve seat 6 on the valve body 7 to enable the disc 5 to close or open the valve seat 6 for regulating a flow therethrough.

Figure 2:
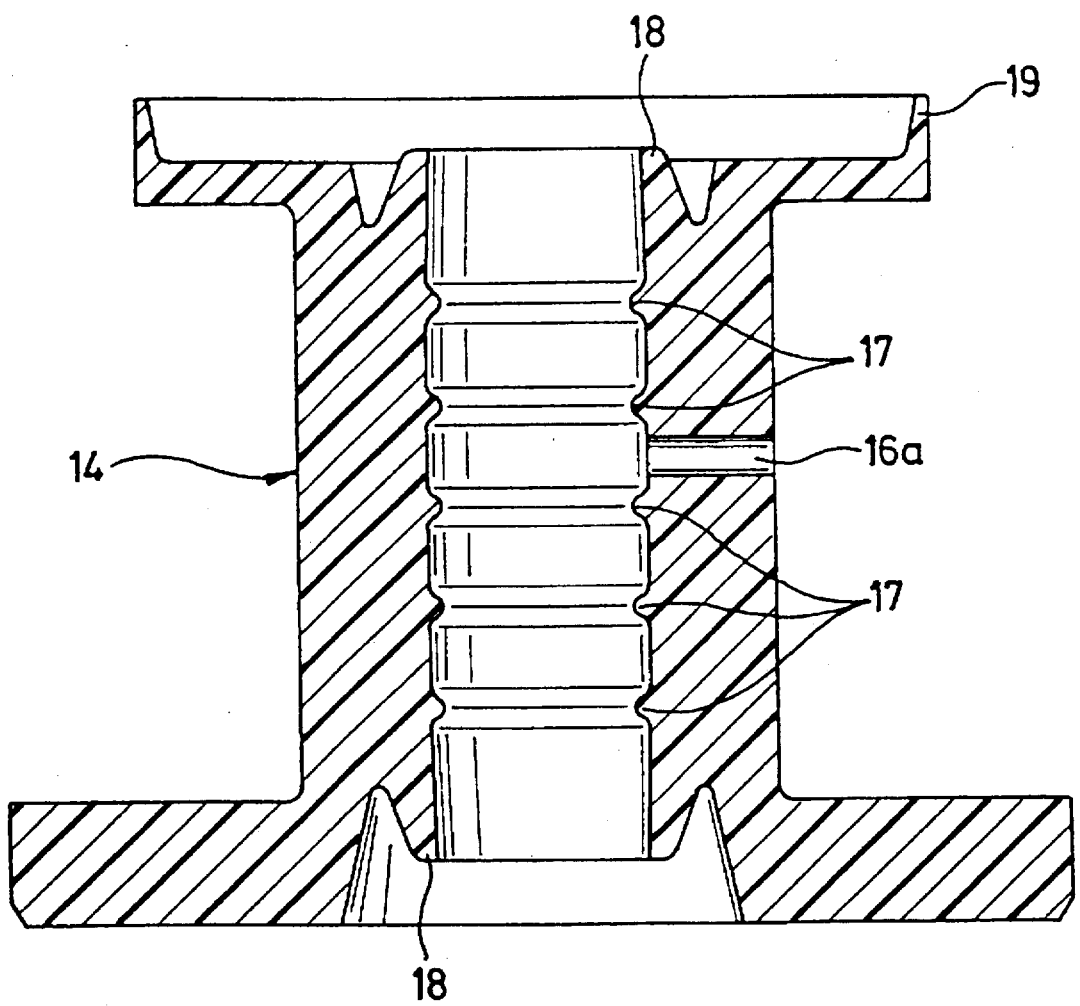
FIG. 2 is a detailed sectional illustration of a sealing arrangement according to the present invention for use in the oblique valve of FIG. 1.

Turning now to FIG. 2, there is shown a detailed illustration of the seal body 14 of the sealing arrangement 13. The seal body 14 is of single-piece, sleeve-like design and made of an elastomer or fluorinated thermoplastic, such as e.g. polyvinyl fluoride. The seal body 14 is formed with several O-ring sealing sections 17 that are spaced in axial direction and jut outwardly for engagement in complementary grooves of the valve stem 4 in a manner shown in FIG. 2. At its axial end faces, the seal body 14 is formed with annular lip sealing sections 18 that bear upon the valve stem 4. In addition, the upper end face is provided with an annular lip 19 for fluid-tight seal of the interior of the housing 2. The annular lip 19 projects axially from the end face in axial direction toward the piston 3, as shown in FIG. 1.

The seal body 14 is received in the receptacle 15 in such a manner that the O-ring sealing sections 17, the annular lip sealing sections 18 and possibly the additional annular lip 19 are under compressive loading and thus mechanically biased whereby the sealing action of the lip sealing sections 18 is independent and separated from the axial sealing action of the valve stem 4 as a consequence of the support of the seal body 14 and the receptacle 15 upon the housing shoulders 20, 21, respectively. The annular lip sealing sections 18, 19 are additionally acted upon by the operational pressure of the fluid, for example for operating the piston 3, or by the pressure of the fluid in the valve body 7.

In accordance with the present invention, the O-ring sealing sections 17 that are integrated in the single-piece uniform seal body 14 together with the annular lip sealing sections 18, 19 define a combined sealing arrangement for an actuator such as valve stem 4. The seal body 14 unites several sealing functions with respect to the valve stem 4 and the housing 2. In addition, the fluid and working spaces are sealed from the outside by the sealing sections integrated within the seal body 14. The compressive force upon the annular lip sealing sections 18, 19 is further determined by the pressure that acts from outside upon the seal body 14 via the fluid and working spaces.

Even though the sealing arrangement 13 has been described for use upon a valve stem 4 of a valve 1, it may certainly be utilized in any construction including a linearly movable actuator that needs to be sealed.

While the invention has been illustrated and described as embodied in a sealing arrangement, it is not intended to be limited to the details shown since various modifications and structural changes may be made without departing in any way from the spirit of the present invention.

What is claimed as new and desired to be protected by Letters Patent is set forth in the appended claims:

1. A sealing arrangement comprising
   a single-piece profiled seal body in form of a sleeve for bearing upon a stem-like structure under bias and having integrally incorporated therein ring gaskets in form of axially spaced O ring sealing sections, a leakage bore for monitoring a fluid-tightness, and annular lip sealing sections formed on axial ends of the seal body for sealing fluid and working spaces;
   a receptacle encircling the seal body to mechanically bias the sealing sections and having incorporated therein a leakage bore in communication with the leakage bore in the seal body; and
   a housing formed with a first shoulder for supporting the seal body and a second shoulder for supporting the receptacle.

2. The sealing arrangement of claim 1 wherein the leakage bore in the seal body is positioned between two axially spaced O ring sealing sections.

3. The sealing arrangement of claim 1 wherein the seal body is made of an elastomer.

4. The sealing arrangement of claim 1 wherein the seal body is made of a fluorinated thermoplastic.

5. The sealing arrangement of claim 1 wherein at least one end face of the seal body is formed with a further annular lip for sealing the interior of the housing.

6. The sealing arrangement of claim 4 wherein the further annular lip projects from the end face in axial direction.

7. The sealing arrangement of claim 1 wherein said first and second shoulders are positioned in staggered relationship.

8. In a valve assembly having a housing, an actuator movably mounted in the housing and a seal for separating the actuator from a fluid flow, said seal comprising: a single-piece profiled seal body in form of a sleeve for bearing upon the actuator under bias and having integrally incorporated therein ring gaskets in form of axially spaced O ring sealing sections, a leakage bore for monitoring a fluid-tightness, and annular lip sealing sections formed on axial ends of the seal body for sealing fluid and working spaces; and a receptacle positioned between the housing and the seal body and encircling the seal body to mechanically bias the sealing sections and having incorporated therein a leakage bore in communication with the leakage bore in the seal body, wherein the housing is formed with a first shoulder for supporting the seal body and a second shoulder for supporting the receptacle.

9. The valve assembly of claim 8 wherein the leakage bore is positioned between two axially spaced O ring sealing sections.

10. The valve assembly of claim 8 wherein the seal body is made of an elastomer.

11. The valve assembly of claim 8 wherein the seal body is made of a fluorinated thermoplastic.

12. The valve assembly of claim 8 wherein at least one end face of the seal body is formed with a further annular lip for sealing the interior of the housing.

13. The valve assembly of claim 12 wherein the further annular lip projects from the end face in axial direction.

14. The valve assembly of claim 8 wherein said first and second shoulders are positioned in staggered relationship.

* * * * *